(12) United States Patent
Yang et al.

(10) Patent No.: US 12,084,746 B2
(45) Date of Patent: Sep. 10, 2024

(54) 4D PRINTING METHOD AND APPLICATION OF TITANIUM-NICKEL SHAPE MEMORY ALLOY

(71) Applicants: SOUTH CHINA UNIVERSITY OF TECHNOLOGY, Guangdong (CN); GUANGDONG HUAYI PLUMBING FITTINGS INDUSTRY CO., LTD., Kaiping (CN); SUN YAT-SEN UNIVERSITY CANCER CENTER, Guangdong (CN)

(72) Inventors: Chao Yang, Guangzhou (CN); Haizhou Lu, Guangzhou (CN); Yanfei Ding, Kaiping (CN); Yuanyuan Li, Guangzhou (CN); Jin Wang, Guangzhou (CN)

(73) Assignees: South China University of Technology, Guangzhou (CN); Guangdong Huayi Plumbing Fittings Industry Co., Ltd., Kaiping (CN); Sun Yat-Sen University Cancer Center, Guangzhou (CN)

( * ) Notice: Subject to any disclaimer, the term of this patent is extended or adjusted under 35 U.S.C. 154(b) by 731 days.

(21) Appl. No.: 17/288,918

(22) PCT Filed: Jan. 3, 2020

(86) PCT No.: PCT/CN2020/070204
§ 371 (c)(1),
(2) Date: Apr. 27, 2021

(87) PCT Pub. No.: WO2020/151476
PCT Pub. Date: Jul. 30, 2020

(65) Prior Publication Data
US 2021/0394268 A1    Dec. 23, 2021

(30) Foreign Application Priority Data

Jan. 24, 2019    (CN) .......................... 201910065832.4

(51) Int. Cl.
C22C 19/03    (2006.01)
B22F 1/14    (2022.01)
(Continued)

(52) U.S. Cl.
CPC .............. *C22C 19/03* (2013.01); *B22F 1/14* (2022.01); *B22F 9/082* (2013.01); *B23K 26/342* (2015.10);
(Continued)

(58) Field of Classification Search
None
See application file for complete search history.

(56) References Cited

U.S. PATENT DOCUMENTS

2016/0074942 A1* 3/2016 Fang ..................... C22C 1/06
75/245
2018/0030580 A1* 2/2018 Ayers ..................... C22C 19/03
(Continued)

FOREIGN PATENT DOCUMENTS

| CN | 103949637 | 7/2014 |
|----|-----------|--------|
| CN | 104116578 | 10/2014 |

(Continued)

OTHER PUBLICATIONS

Machine translation of CN 108044109 A, Feb. 2024 (Year: 2024).*
(Continued)

*Primary Examiner* — Geoffrey S Evans
(74) *Attorney, Agent, or Firm* — JMB DAVIS BEN-DAVID

(57) ABSTRACT

Disclosed are a 4D printing method and application of titanium-nickel shape memory alloy. The 4D printing
(Continued)

method comprises the following steps: mixing and smelting pure titanium and pure nickel to obtain titanium-nickel alloy bars, then preparing alloy powder by a rotating electrode atomization method, and sieving the powder to obtain titanium-nickel alloy powder with a particle size of 15-53 μm; placing the obtained titanium-nickel alloy powder in a discharge plasma assisted ball mill for discharge treatment to perform surface modification of the powder; and subjecting the titanium-nickel alloy powder to SLM forming to obtain the titanium-nickel shape memory alloy.

8 Claims, 1 Drawing Sheet

(51) Int. Cl.
| | | |
|---|---|---|
| *B22F 9/08* | (2006.01) | |
| *B23K 26/342* | (2014.01) | |
| *B33Y 10/00* | (2015.01) | |
| *B33Y 40/10* | (2020.01) | |
| *B33Y 70/00* | (2020.01) | |
| *C22C 1/04* | (2023.01) | |
| *C22C 19/00* | (2006.01) | |
| *B22F 10/28* | (2021.01) | |
| *B22F 10/34* | (2021.01) | |
| *B22F 10/36* | (2021.01) | |
| *B23K 103/14* | (2006.01) | |

(52) U.S. Cl.
CPC .............. *B33Y 10/00* (2014.12); *B33Y 40/10* (2020.01); *B33Y 70/00* (2014.12); *C22C 1/0433* (2013.01); *C22C 19/007* (2013.01); *B22F 2009/0836* (2013.01); *B22F 10/28* (2021.01); *B22F 10/34* (2021.01); *B22F 10/36* (2021.01); *B22F 2301/15* (2013.01); *B22F 2304/10* (2013.01); *B23K 2103/14* (2018.08)

(56) References Cited

U.S. PATENT DOCUMENTS

| | | | | |
|---|---|---|---|---|
| 2019/0176234 A1* | 6/2019 | Heard | .................... | B33Y 10/00 |
| 2022/0055891 A1* | 2/2022 | Knick | ....................... | B81B 7/04 |

FOREIGN PATENT DOCUMENTS

| | | | | | |
|---|---|---|---|---|---|
| CN | 104325136 | | 2/2015 | | |
| CN | 105522161 | | 4/2016 | | |
| CN | 105642905 | | 6/2016 | | |
| CN | 105642905 A | * | 6/2016 | | |
| CN | 106825594 A | * | 6/2017 | ............ | B22F 1/0048 |
| CN | 107022692 | | 8/2017 | | |
| CN | 107326402 A | * | 11/2017 | ............... | C25C 5/04 |
| CN | 108044109 A | * | 5/2018 | | |
| CN | 108145172 | | 6/2018 | | |
| CN | 109022920 | | 12/2018 | | |
| CN | 109022920 A | * | 12/2018 | ............ | B22F 3/1055 |
| CN | 109128205 A | * | 1/2019 | ............. | B22F 9/082 |
| CN | 109648082 | | 4/2019 | | |
| CN | 208960995 U | * | 6/2019 | ............. | B22F 9/082 |
| KR | 20110055891 | | 5/2011 | | |
| WO | WO-9961668 A1 | * | 12/1999 | ............. | C22F 1/006 |
| WO | WO-2010103691 A1 | * | 9/2010 | ............... | C21D 7/06 |
| WO | WO-2011014962 A1 | * | 2/2011 | ......... | B23K 26/0006 |
| WO | WO-2016101187 A1 | * | 6/2016 | ............. | B02C 17/14 |
| WO | WO-2020241176 A1 | * | 12/2020 | ............... | C21D 8/06 |

OTHER PUBLICATIONS

Machine translation of CN 106825594 A, Feb. 2024 (Year: 2024).*
Machine translation of CN-208960995-U, Feb. 2024 (Year: 2024).*
Machine translation of Cn 107326402-A, Feb. 2024 (Year: 2024).*
Machine translation of CN108907210A (Year: 2024).*
MachinetransWO2016101187A1, Feb. 2024 (Year: 2024).*
Machine translation of CN-109022920-A, Feb. 2024 (Year: 2024).*
Machine translation of CN-105642905-A, Feb. 2024 (Year: 2024).*
Machine translation of WO 2010/103691 A1, Feb. 2024 (Year: 2024).*
Machine translation of CN-109128205-A, Feb. 2024.*
Machine translation WO2020241176A1, Feb. 2024 (Year: 2024).*

* cited by examiner

4D PRINTING METHOD AND APPLICATION OF TITANIUM-NICKEL SHAPE MEMORY ALLOY

CROSS-REFERENCE TO RELATED APPLICATIONS

This is the U.S. National Stage of International Patent Application No. PCT/CN2020/070204 filed on Jan. 3, 2020, which in turn claims the benefit of Chinese Patent Application No. 201910065832.4 filed on Jan. 24, 2019.

FIELD OF THE INVENTION

The present invention belongs to the technical field of shape memory alloy preparation, and specifically relates to a 4D printing method and application of titanium-nickel shape memory alloy.

BACKGROUND OF THE INVENTION

Among many shape memory alloys, titanium-nickel shape memory alloy has excellent biocompatibility, and is widely used in the field of biomedicine, such as orthodontic wires, spine orthopedic rods, intramedullary needles/nails, angioplasty rings, and surgical micro forceps. Besides, it is widely used in the fields of pipe joints, pipe fixation, spring drive devices, temperature controllers, temperature sensor triggers and the like due to its excellent shape memory effect and super elasticity, and widely used in the fields of vibration control components, cone dampers and the like due to its high damping performance, and has application prospects in the fields of chemical industry, ship parts and the like due to its excellent corrosion resistance.

However, for the titanium-nickel shape memory alloy, the traditional preparation process (smelting casting, hot isostatic pressing, powder metallurgy, etc.) has the following problems: (1) The phase transition temperature is very sensitive to the chemical composition of the titanium-nickel shape memory alloy, and impurity elements (such as C, N and O) will be introduced in the smelting and casting process, which will affect the shape memory performance of the alloy; (2) the machinability of the titanium-nickel shape memory alloy is poor, which reduces the production efficiency; and (3) the cost of the traditional production process of the memory alloy is high, which makes the final product expensive, not conducive to wide use. Therefore, for precision and complex titanium-nickel alloy parts such as porous structures and actuators, there are problems with the traditional process, such as inability to form or high forming costs. As a result, exploring a new process for forming the titanium-nickel alloy and expanding the application field of the titanium-nickel alloy without reducing the performance have become an urgent problem to be solved.

4D printing is an additive manufacturing technology for smart materials. The "D" in 4D printing refers to dimensions such as time and space. 4D printing enables the shape, performance or function of smart components to respond quickly to changes in time and space driven by temperature, stress and other external fields according to the pre-design, so as to achieve an integrated design of structure and function. Therefore, the 4D printing technology proposed by the present invention can realize Selective Laser Melting (SLM) forming of titanium-nickel alloy powder.

SLM technology can directly melt metal powder completely under the heat effect of laser beam according to a 3D data model and solidify the melt into a metal part with good metallurgical bonding and high precision, especially suitable for the manufacture of complex thin-walled precision components such as those with thin walls, complicated internal cavities and internal flow paths that are difficult to achieve by traditional machining techniques. Besides, the molten powder of the SLM technology has a high cooling rate during solidification and experiences a wide range of non-equilibrium solidification in the cooling process, which can refine the grains and increase the solid solubility, so that the formed part has fine and compact structure, uniform composition, and excellent performance. In addition, the SLM technology can also reduce the capital investment in mold design, and only needs about 20% of the cost of the traditional manufacturing process and about 10% of the time to manufacture the required parts, greatly improving the production efficiency.

At present, there are few reports on successful cases of using the SLM technology to prepare high-performance titanium-nickel alloy and the parts thereof. This preparation is difficult in the following aspects: (1) It is difficult to machine the titanium-nickel alloy; (2) the titanium-nickel alloy has complex phase composition including a B2 austenite phase, a B19' martensite phase, an R phase, a precipitation phase and so on, which have low thermal conductivity, not conducive to 4D printing forming; and (3) the 4D printing process is contradictory in that it requires sufficiently high energy to completely melt the metal powder to obtain nearly fully dense bulk materials, while requires sufficiently low energy input to minimize the temperature gradient and residual stress between the molten pool and the powder to avoid cracking tendency. In the research report on the additive manufacturing of titanium-nickel alloy (Reference 1: Prog. Mater. Sci. 83 (2016) 630-663), the energy suitable for the additive manufacturing of titanium-nickel alloy was usually 50-100 J/mm$^3$, which was relatively low, and the optimal tensile properties of the additively manufactured titanium-nickel alloy included a tensile strength of 606 MPa and an elongation of 6.8%. The targeted alloy system was $Ni_{50.1}Ti_{49.9}$ (Reference 2: Mater. Sci. Eng. A 724 (2018) 220-230), and the optimal shape memory performance of the additively manufactured titanium-nickel alloy was a recovery angle of 20°. The targeted alloy system was $Ni_{50.9}Ti_{49.1}$ (Reference 3: Sci. Rep. 7 (2017) 46707). In view of these, it is necessary to develop a method of using the additive manufacturing technology to prepare the high-performance titanium-nickel shape memory alloy, so as to expand the industrial application field of the titanium-nickel alloy.

Contents of the Invention

In order to improve the current situation that the high-performance titanium-nickel alloy and the parts thereof cannot be formed by 4D printing technology, the primary object of the present invention is to provide a 4D printing method for forming the titanium-nickel shape memory alloy.

This method has fast manufacturing speed and short production cycle, and allows batch production, individualized manufacturing and remote control, especially suitable for thin-walled, special-shaped and complex-structured products. Meanwhile, it effectively solves the problems encountered in the traditional process, making the production more environmentally friendly and more efficient, greatly speeding up application of the titanium-nickel alloy. Moreover, the present invention provides a new process path for preparing ultra-high performance titanium-nickel alloy.

Another object of the present invention is to provide a titanium-nickel shape memory alloy prepared by the above method.

Still another object of the present invention is to provide the application of the above-mentioned titanium-nickel shape memory alloy in the preparation of eyeglass frames, orthodontic wires, compression bone plates, spinal orthopedic rods, drive devices, executive components, complex dampers, corrosion-resistant equipment, intelligent temperature control devices, self-expanding trusses, self-expanding communication satellite parts, variant aircraft parts, etc.

The objects of the present invention are achieved through the following technical solution:

A 4D printing method of titanium-nickel shape memory alloy is provided, comprising the following steps:

(1) Milling: mixing and smelting pure titanium and pure nickel to obtain titanium-nickel alloy bars, then preparing alloy powder by a rotating electrode atomization method, and sieving the powder to obtain titanium-nickel alloy powder with a particle size of 15-53 μm;

(2) powder modification: placing the titanium-nickel alloy powder obtained in step (1) in a discharge plasma assisted ball mill for discharge treatment to perform surface modification of the powder; and (3) 4D printing forming: subjecting the titanium-nickel alloy powder after the surface modification treatment in step (2) to SLM forming to obtain the titanium-nickel shape memory alloy.

Preferably, the atomic percentage elemental composition of the titanium-nickel alloy bar in step (1) is Ti 44-55 at. %, with the balance of Ni.

Preferably, the rotating electrode atomization method in step (1) comprises the following specific steps: Using electrode induction gas atomization milling equipment to heat the titanium-nickel alloy bar to a temperature of 1250° C. to 1500° C. through electrode induction; atomizing the bar with high-purity argon gas to obtain alloy powder, with the pressure during the atomization process controlled at 2.5-8 MPa.

Preferably, the conditions of the surface modification in step (2) are as follows: No ball milling medium is added, and the protective atmosphere is 0.15-0.2 MPa high-purity argon gas; the discharge voltage is controlled at (130±5) V, the current is controlled at 1.2-2 A, and the motor speed is 600-1200 r/min; the duration of each discharge treatment is 1-2 h, the time interval between two adjacent discharge treatments is 30 min, and the number of the discharge treatment is 6-10 times.

Preferably, the conditions of the SLM forming in step (3) are as follows: the laser power P≥60 W, the laser scanning speed v≤200 mm/s, and the laser scanning distance h=60-100 μm; the thickness t of the powder layer meets t=30~60 μm, and the energy input density E (E=P/v×h×t) meets 150 J/mm$^3$≤E≤300 J/mm$^3$; the energy density used is much higher than the commonly used low values currently reported in the literature.

A titanium-nickel shape memory alloy is prepared by the above method; the phase composition of the titanium-nickel shape memory alloy consists of a B2 austenite phase with the CsCl type structure, a B19' martensite phase with the monoclinic structure, and a Ti$_2$Ni precipitation phase; the microstructure of the titanium-nickel shape memory alloy includes nano-scale cellular crystals and micron-scale dendrites, which are alternately distributed in layers. The microstructure is different from the reported observed square grains, lamellar martensite, fine grains, and S-shaped grains (References 1, 2 and 4: Mater. Charact. 94 (2014) 189-202; Reference 5: Acta Mater. 144 (2018) 552-560). For the nano-scale cellular crystals, the grain boundaries are composed of discontinuous Ti$_2$Ni precipitates with a size of 20-180 nm, and there are a large number of nano-scale twin crystals inside; the micron-scale dendrites have inside high-density dislocations and a dispersed Ti$_2$Ni nanoparticle phase with a size of 5-30 nm.

The above-mentioned titanium-nickel shape memory alloy is applied in the preparation of eyeglass frames, orthodontic wires, compression bone plates, spinal orthopedic rods, drive devices, executive components, complex dampers, corrosion-resistant equipment, intelligent temperature control devices, self-expanding trusses, self-expanding communication satellite parts, variant aircraft parts, etc.

The principle of the present invention is as follows: By performing surface modification treatment on the titanium-nickel alloy powder, the present invention introduces the discharge plasma into the alloy powder, so that the mechanical force and plasma can synergistically promote microstructure refinement, activation and the like of the powder. The plasma mainly has two effects: (1) the thermal effect; and (2) the high-energy electron bombardment effect. The electron temperature of the plasma can be as high as 104 K; the high-speed and high-temperature pulse electrons impact the surface of the material, which increases the thermal stress and strain in the micro-area of the powder surface, leading to the "thermal explosion" phenomenon of the material. In addition, with the material particles in the plasma highly active, when these particles are adsorbed and deposited on the surface of the powder, they will cause high-energy activation of the surface of the material, improve the diffusion ability of the powder atoms, and discharge to induce mechanisms such as self-propagating reactions. The coupling of plasma and mechanical vibration can greatly accelerate the surface modification of the titanium-nickel alloy powder, significantly reduce the reaction activation energy, greatly improve the activity of the titanium-nickel alloy powder and enhance the synthesis ability of compounds, promote the diffusion of atoms or ions, and induce low-temperature reactions. This improves the interaction between the titanium-nickel alloy powder and laser in the subsequent 4D printing forming process, which makes the titanium-nickel alloy powder melt faster and then the nucleation speed increased, thereby obtaining a microstructure with unique ultra-high performance.

The preparation method of the present invention and the obtained product have the following advantages and beneficial effects:

(1) The titanium-nickel shape memory alloy, as an intermetallic compound, has low thermal conductivity and large thermal stress, which is easy to cause cracking. Therefore, the alloy is usually formed with low energy density (50-100 J/mm$^3$), and it is difficult to form dense and high-performance titanium-nickel alloy with high energy density. The processed titanium-nickel alloy powder of the present invention can be formed at an energy density of 150 J/mm$^3$≤E≤300 J/mm$^3$; the prepared titanium-nickel alloy has a density of ≥99.5%, significantly higher strength and elongation compared with the titanium-nickel alloy formed by the reported SLM technology, as well as much better shape memory performance than those reported in the current literature.

(2) The present invention, adopting 4D printing forming process to prepare the titanium-nickel shape memory alloy, can form complex-shaped titanium-nickel alloy parts according to the designed three-dimensional model, realize the rapid manufacturing of complex-structured titanium-nickel alloy parts, and greatly expand the application of the titanium-nickel alloy in medical, sanitary, aerospace and other fields.

DETAILED DESCRIPTION OF THE EMBODIMENTS

Figure 1:
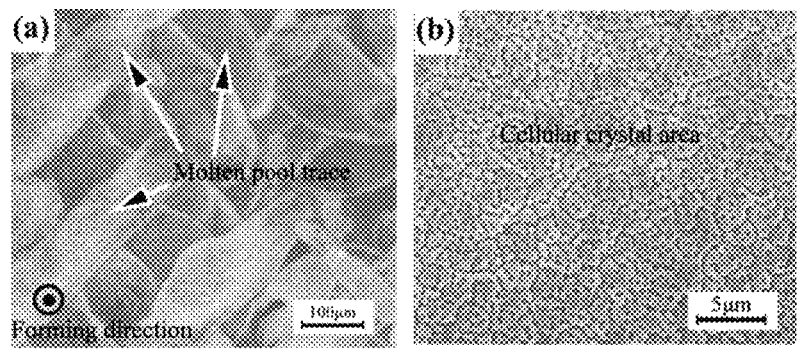
FIG. 1 shows a scanning electron microscope image of the titanium-nickel alloy prepared by 4D printing in Example 1 ((a) and (b) in the figure show different areas under different magnifications).

The present invention will be further described below in detail with reference to examples, but the embodiments of the present invention are not limited thereto.

Example 1

(1) Milling: Formulating titanium and nickel according to the atomic ratio of Ti 50.6 at. % and Ni 49.4 at. %; smelting to obtain the titanium-nickel alloy bar in vacuum; using AMC-EIGA-50 milling equipment to heat the bar to 1350° C.; atomizing the bar in argon gas of 4.5 MPa; and collecting the obtained original powder for screening treatment, and controlling the particle size of the target powder in the range of 15-53 μm.

(2) Powder modification: Putting the titanium-nickel alloy powder into a stainless steel ball milling tank in a vacuum glove box (no stainless steel balls or other ball milling media are added to the ball milling tank); taking out the stainless steel tank, and filling this vacuum tank with high-purity argon gas (0.15-0.2 MPa); placing the stainless steel tank in a Plasma-BM-S plasma ball mill for discharge treatment; the control parameters were as follows: 125 V for the voltage, 1.4 A for the current, 800 r/min for the electrode speed, 1 h for the duration of each discharge treatment, 30 min for the time interval between two adjacent discharge treatments, and 6 times for the number of the discharge treatment.

(3) 4D printing forming: Using SLM forming equipment (Model Concept Laser M2) to perform 4D printing forming on the powder after discharge treatment; the process parameters were as follows: laser power P=70 W, laser scanning speed v=105 mm/s, laser scanning distance h=100 μm, thickness of the powder layer t=30 μm, and energy input density $E=P/v \times h \times t=222$ J/mm$^3$; the specific forming steps were as follows: constructing a three-dimensional model of the structural parts to be prepared, and inputting the model into Magics 15.01 for layered processing; inputting data file into SLM forming equipment, setting the process parameters, and saving these settings; sealing the forming chamber, and using a vacuum pump to evacuate the forming chamber to a vacuum of $6 \times 10^{-2}$ Pa; then filling the forming chamber with high-purity protective argon gas to ensure that the oxygen content in the forming chamber was always below 200 ppm during the laser forming process; pre-spreading the titanium-nickel alloy powder uniformly to a thickness of 30 μm on a substrate using a powder-spreading device, and sending the excess powder to a recovery tank for later collection and reuse; melting the pre-spread alloy powder by a laser according to the set process parameters as well as the designed slice shape and laser scanning strategy, then lowering the formed substrate by a distance of the powder spreading thickness (30 μm), and pre-spreading again the powder of the same thickness on the melted layer to get melted by the laser again. The above steps were repeated until an alloy block with the preset size and shape was obtained, and then the formed part was cut from the forming substrate to obtain a formed alloy sample.

Figure 2:
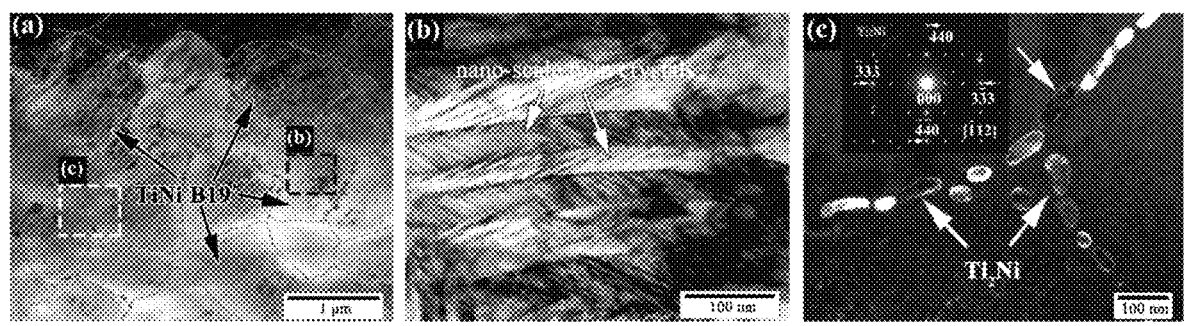
FIG. 2 shows a transmission electron microscope image of the titanium-nickel alloy prepared by 4D printing in Example 1 ((a), (b) and (c) in the figure show different areas under different magnifications).

The surface of the titanium-nickel alloy sample formed in this example was polished, its density was measured by Archimedes drainage method, and its tensile properties were tested in accordance with the international standard (Chinese GB/T 228-2002). The result shows that the titanium-nickel alloy prepared by the 4D printing technology in this example had a density of 99.5%, and was composed of a B2 austenite phase with the CsCl type structure, a B19' martensite phase with the monoclinic structure and a Ti$_2$Ni precipitation phase; the microstructure was characterized by alternate layers of micron-scale dendrites and nano-scale cellular crystals (FIG. 1); the nano-scale cellular crystals had grain boundaries that were composed of a discontinuous Ti$_2$Ni precipitation phase with a diameter of 20-30 nm and a length of 20-100 nm, as well as a large number of nano-scale twin crystals inside (FIG. 2); the micron-scale dendrites had inside high-density dislocations and a dispersed Ti$_2$Ni nanoparticle phase with a size of 5-20 nm. The microstructure obtained in the present invention was completely different from the reported observed square grains, lamellar martensite, fine grains, S-shaped grains, etc. (References 1, 2, 4 and 5). The titanium-nickel alloy obtained by 4D printing had a tensile strength of 778 MPa and an elongation of 7.2%, which were much higher than the tensile strength of 606 MPa and the elongation of 6.8% of the Ni$_{50.1}$Ti$_{49.9}$ alloy (Reference 2); when the bending angle of the long sheet sample of the titanium-nickel alloy obtained by 4D printing was 180°, the shape memory effect could make the sample completely recover its shape with a recovery rate of 100%; when the bending angle of the long sheet sample was 261°, the shape memory effect could make the sample recover its shape to 232° with a recovery rate of 90%; these results show that the shape memory performance of the titanium-nickel alloy obtained by 4D printing is much better than that of the Ni$_{50.9}$Ti$_{49.1}$ alloy with a recovery angle of 20° (Reference 3). In addition, the titanium-nickel alloy obtained by 4D printing had the superelastic strain in the austenitic state reaching 5.8%, and the strain recovery rate exceeding 90%.

Example 2

(1) Milling: Formulating titanium and nickel according to the atomic ratio of Ti 49.5 at. % and Ni 50.5 at. %; smelting to obtain the titanium-nickel alloy bar in vacuum; using AMC-EIGA-50 milling equipment to heat the bar to 1400° C.; atomizing the bar in argon gas of 3 MPa; and collecting the obtained original powder for screening treatment, and controlling the particle size of the target powder in the range of 15-53 μm.

(2) Powder modification: Putting the titanium-nickel alloy powder into a stainless steel ball milling tank in a vacuum glove box (no stainless steel balls or other ball milling media are added to the ball milling tank); taking out the stainless steel tank, and filling this vacuum tank with high-purity argon gas (0.15-0.2 MPa); placing the stainless steel tank in a Plasma-BM-S plasma ball mill for discharge treatment; the control parameters were as follows: 135 V for the voltage, 1.7 A for the current, 1000 r/min for the electrode speed, 1.2 h for the duration of each discharge treatment, 30 min for the time interval between two adjacent discharge treatments, and 8 times for the number of the discharge treatment.

(3) 4D printing forming: Using SLM forming equipment (Model Concept Laser M2) to perform 4D printing forming on the powder after discharge treatment; the specific forming steps were the same as those in Example 1; the process parameters were as follows: laser power P=70 W, laser scanning speed v=80 mm/s, laser scanning distance h=100 μm, thickness of the powder layer t=30 μm, and energy input density $E=P/v \times h \times t=292$ J/mm$^3$.

Figure 3:
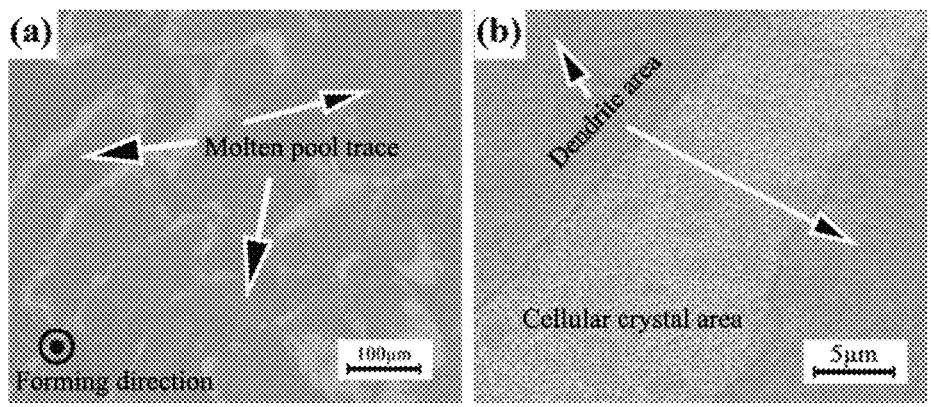
FIG. 3 shows a scanning electron microscope image of the titanium-nickel alloy prepared by 4D printing in Example 2 ((a) and (b) in the figure show different areas under different magnifications).
Figure 4:
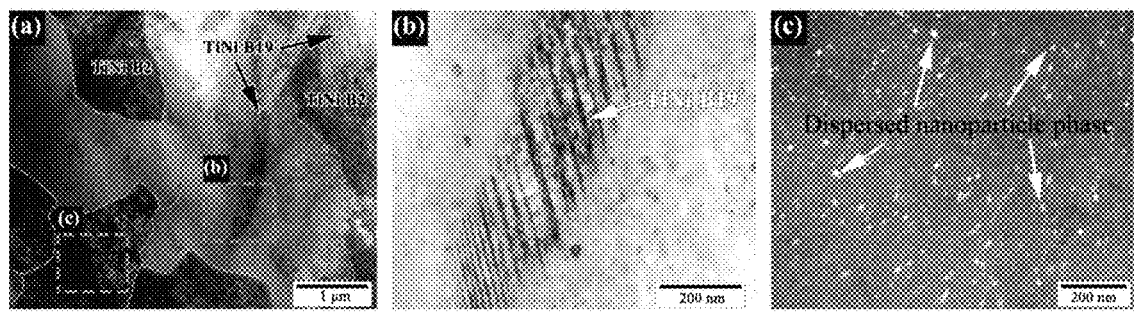
FIG. 4 shows a transmission electron microscope image of the titanium-nickel alloy prepared by 4D printing in Example 2 ((a), (b) and (c) in the figure show different areas under different magnifications).

The surface of the titanium-nickel alloy sample formed in this example was polished, its density was measured by Archimedes drainage method, and its tensile properties were tested in accordance with the international standard (Chinese GB/T 228-2002). The result shows that the titanium-nickel alloy prepared by the 4D printing technology in this example had a density of 99.6%, and was composed of a B2 austenite phase with the CsCl type structure, a B19' martensite phase with the monoclinic structure and a $Ti_2Ni$ precipitation phase; the microstructure was characterized by alternate layers of micron-scale dendrites and nano-scale cellular crystals (FIG. 3); the nano-scale cellular crystals had grain boundaries that were composed of a discontinuous $Ti_2Ni$ precipitation phase with a diameter of 25-35 nm and a length of 25-150 nm, as well as a large number of nano-scale twin crystals inside; the micron-scale dendrites had inside high-density dislocations and a dispersed $Ti_2Ni$ nanoparticle phase with a size of 10-20 nm (FIG. 4). The microstructure obtained in the present invention was completely different from the reported observed square grains, lamellar martensite, fine grains, S-shaped grains, etc. (References 1, 2, 4 and 5). The titanium-nickel alloy obtained by 4D printing had a tensile strength of 708 MPa and an elongation of 7.0%, which were much higher than the tensile strength of 606 MPa and the elongation of 6.8% of the $Ni_{50.1}Ti_{49.9}$ alloy (Reference 2); when the bending angle of the long sheet sample of the titanium-nickel alloy obtained by 4D printing was 162°, the shape memory effect could make the sample completely recover its shape with a recovery rate of 100%; these results show that the shape memory performance of the titanium-nickel alloy obtained by 4D printing is much better than that of the $Ni_{50.9}Ti_{49.1}$ alloy with a recovery angle of 20° (Reference 3). The titanium-nickel alloy obtained by 4D printing had the superelastic strain in the austenitic state reaching 5.5%, and the strain recovery rate exceeding 90%.

Example 3

(1) Milling: Formulating titanium and nickel according to the atomic ratio of Ti 44 at. % and Ni 56 at. %; smelting to obtain the titanium-nickel alloy bar in vacuum; using AMC-EIGA-50 milling equipment to heat the bar to 1250° C.; atomizing the bar in argon gas of 2.5 MPa; and collecting the obtained original powder for screening treatment, and controlling the particle size of the target powder in the range of 15-53 μm.

(2) Powder modification: Putting the titanium-nickel alloy powder into a stainless steel ball milling tank in a vacuum glove box (no stainless steel balls or other ball milling media are added to the ball milling tank); taking out the stainless steel tank, and filling this vacuum tank with high-purity argon gas (0.15-0.2 MPa); placing the stainless steel tank in a Plasma-BM-S plasma ball mill for discharge treatment; the control parameters were as follows: 125 V for the voltage, 1.2 A for the current, 1200 r/min for the electrode speed, 2 h for the duration of each discharge treatment, 30 min for the time interval between two adjacent discharge treatments, and 10 times for the number of the discharge treatment.

(3) 4D printing forming: Using SLM forming equipment (Model Concept Laser M2) to perform 4D printing forming on the powder after discharge treatment; the specific forming steps were the same as those in Example 1; the process parameters were as follows: laser power P=70 W, laser scanning speed v=120 mm/s, laser scanning distance h=100 μm, thickness of the powder layer t=30 μm, and energy input density $E=P/v \times h \times t=194$ J/mm$^3$.

The surface of the titanium-nickel alloy sample formed in this example was polished, its density was measured by Archimedes drainage method, and its tensile properties were tested in accordance with the international standard (Chinese GB/T 228-2002). The result shows that the titanium-nickel alloy prepared by the 4D printing technology in this example had a density of 99.6%, and was composed of a B2 austenite phase with the CsCl type structure, a B19' martensite phase with the monoclinic structure and a $Ti_2Ni$ precipitation phase; the microstructure was characterized by alternate layers of micron-scale dendrites and nano-scale cellular crystals; the nano-scale cellular crystals had grain boundaries that were composed of a discontinuous $Ti_2Ni$ precipitation phase with a diameter of 20-30 nm and a length of 50-180 nm, as well as a large number of nano-scale twin crystals inside; the micron-scale dendrites had inside high-density dislocations and a dispersed $Ti_2Ni$ nanoparticle phase with a size of 5-20 nm. The microstructure obtained in the present invention was completely different from the reported observed square grains, lamellar martensite, fine grains, S-shaped grains, etc. (References 1, 2, 4 and 5). The titanium-nickel alloy obtained by 4D printing had a tensile strength of 728 MPa and an elongation of 7.3%, which were much higher than the tensile strength of 606 MPa and the elongation of 6.8% of the $Ni_{50.1}Ti_{49.9}$ alloy (Reference 2); when the bending angle of the long sheet sample of the titanium-nickel alloy obtained by 4D printing was 158°, the shape memory effect could make the sample completely recover its shape with a recovery rate of 100%; these results show that the shape memory performance of the titanium-nickel alloy obtained by 4D printing is much better than that of the $Ni_{50.9}Ti_{49.1}$ alloy with a recovery angle of 20° (Reference 3). The titanium-nickel alloy obtained by 4D printing had the superelastic strain in the austenitic state reaching 5.3%, and the strain recovery rate exceeding 90%.

Example 4

(1) Milling: Formulating titanium and nickel according to the atomic ratio of Ti 55 at. % and Ni 45 at. %; smelting to obtain the titanium-nickel alloy bar in vacuum; using AMC-EIGA-50 milling equipment to heat the bar to 1500° C.; atomizing the bar in argon gas of 8 MPa; and collecting the obtained original powder for screening treatment, and controlling the particle size of the target powder in the range of 15-53 μm.

(2) Powder modification: Putting the titanium-nickel alloy powder into a stainless steel ball milling tank in a vacuum glove box (no stainless steel balls or other ball milling media are added to the ball milling tank); taking out the stainless steel tank, and filling this vacuum tank with high-purity argon gas (0.15-0.2 MPa); placing the stainless steel tank in a Plasma-BM-S plasma ball mill for discharge treatment; the control parameters were as follows: 125 V for the voltage, 2 A for the current, 600 r/min for the electrode speed, 1 h for the duration of each discharge treatment, 30 min for the time interval between two adjacent discharge treatments, and 6 times for the number of the discharge treatment.

(3) 4D printing forming: Using SLM forming equipment (Model Concept Laser M2) to perform 4D printing forming on the powder after discharge treatment; the specific forming steps were the same as those in Example 1; the process parameters were as follows: laser power P=70 W, laser scanning speed v=150 mm/s, laser scanning distance h=100 μm, thickness of the powder layer t=30 μm, and energy input density $E=P/v \times h \times t=155$ J/mm$^3$.

The surface of the titanium-nickel alloy sample formed in this example was polished, its density was measured by Archimedes drainage method, and its tensile properties were tested in accordance with the international standard (Chinese GB/T 228-2002). The result shows that the titanium-nickel alloy prepared by the 4D printing technology in this example had a density of 99.6%, and was composed of a B2 austenite phase with the CsCl type structure, a B19' martensite phase with the monoclinic structure and a Ti$_2$Ni precipitation phase; the microstructure was characterized by alternate layers of micron-scale dendrites and nano-scale cellular crystals; the nano-scale cellular crystals had grain boundaries that were composed of a discontinuous Ti$_2$Ni precipitation phase with a diameter of 30-40 nm and a length of 40-180 nm, as well as a large number of nano-scale twin crystals inside; the micron-scale dendrites had inside high-density dislocations and a dispersed Ti$_2$Ni nanoparticle phase with a size of 5-30 nm. The microstructure obtained in the present invention was completely different from the reported observed square grains, lamellar martensite, fine grains, S-shaped grains, etc. (References 1, 2, 4 and 5). The titanium-nickel alloy obtained by 4D printing had a tensile strength of 758 MPa and an elongation of 7.1%, which were much higher than the tensile strength of 606 MPa and the elongation of 6.8% of the Ni$_{50.1}$Ti$_{49.9}$ alloy (Reference 2); when the bending angle of the long sheet sample of the titanium-nickel alloy obtained by 4D printing was 163°, the shape memory effect could make the sample completely recover its shape with a recovery rate of 100%; these results show that the shape memory performance of the titanium-nickel alloy obtained by 4D printing is much better than that of the Ni$_{50.9}$Ti$_{49.1}$ alloy with a recovery angle of 20° (Reference 3). The titanium-nickel alloy obtained by 4D printing had the superelastic strain in the austenitic state reaching 5.6%, and the strain recovery rate exceeding 90%.

The above examples are preferred embodiments of the present invention, but the embodiments of the present invention are not limited by the above examples. Any other alteration, modification, replacement, combination and simplification made without departing from the spiritual essence and principle of the present invention shall be equivalent substitutions and fall within the scope of protection of the present invention.

The invention claimed is:

1. A 4D printing method of titanium-nickel shape memory alloy, characterized in that: this method comprises the following steps:
   (1) milling: mixing and smelting pure titanium and pure nickel to obtain titanium-nickel alloy bars, then preparing alloy powder by a rotating electrode atomization method, and sieving the powder to obtain titanium-nickel alloy powder with a particle size of 15-53 μm;
   (2) powder modification: placing the titanium-nickel alloy powder obtained in step (1) in a discharge plasma assisted ball mill for discharge treatment to perform surface modification of the powder; and
   (3) 4D printing forming: subjecting the titanium-nickel alloy powder after the surface modification treatment in step (2) to SLM forming to obtain a titanium-nickel shape memory alloy;
   wherein the rotating electrode atomization method in step (1) comprises the following specific steps: using electrode induction gas atomization milling equipment to heat the titanium-nickel alloy bar to a temperature of 1250° C. to 1500° C. through electrode induction; atomizing the bar with high-purity argon gas to obtain alloy powder, with the pressure during the atomization process controlled at 2.5-8 MPa.

2. The 4D printing method of titanium-nickel shape memory alloy according to claim 1, characterized in that: the atomic percentage elemental composition of the titanium-nickel alloy bar in step (1) is Ti 44-55 at. %, with the balance of Ni.

3. The 4D printing method of titanium-nickel shape memory alloy according to claim 1, characterized in that: the conditions of the surface modification in step (2) are as follows: no ball milling medium is added, and the protective atmosphere is 0.15-0.2 MPa high-purity argon gas; the discharge voltage is controlled at (130±5) V, the current is controlled at 1.2-2 A, and the motor speed is 600-1200 r/min; the duration of each discharge treatment is 1-2 hours, the time interval between two adjacent discharge treatments is 30 min, and the number of the discharge treatment is 6-10 times.

4. The 4D printing method of titanium-nickel shape memory alloy according to claim 1, characterized in that: the conditions of the SLM forming in step (3) are as follows: laser beam power P≥60 W, laser beam scanning speed v≤200 mm/s, and laser beam scanning distance h=60-100 μm; the thickness t of the powder layer meets t=30~60 μm, and the energy input density E meets 150 J/mm$^3$≤E≤300 J/mm$^3$.

5. A titanium-nickel shape memory alloy, characterized in that: it is prepared by the method according to any of claim 1; the phase composition of the titanium-nickel shape memory alloy consists of a B2 austenite phase with the CsCl type structure, a B19' martensite phase with the monoclinic structure, and a Ti$_2$Ni precipitation phase; the microstructure of the titanium-nickel shape memory alloy includes nano-scale cellular crystals and micron-scale dendrites, which are alternately distributed in layers.

6. Application of the titanium-nickel shape memory alloy according to claim 5 in the preparation of eyeglass frames, orthodontic wires, compression bone plates, spinal orthopedic rods, drive devices, components, complex dampers, corrosion-resistant equipment, intelligent temperature control devices, self-expanding trusses, self-expanding communication satellite parts, and variant aircraft parts.

7. The titanium-nickel shape memory alloy according to claim 5, characterized in that: for the nano-scale cellular crystals, the grain boundaries are composed of discontinuous Ti$_2$Ni precipitates with a size of 20-180 nm, and there are nano-scale twin crystals inside; the micron-scale dendrites have inside high-density dislocations and a dispersed Ti$_2$Ni nanoparticle phase with a size of 5-30 nm.

8. Application of the titanium-nickel shape memory alloy according to claim 7 in the preparation of eyeglass frames, orthodontic wires, compression bone plates, spinal orthopedic rods, drive devices, components, complex dampers, corrosion-resistant equipment, intelligent temperature control devices, self-expanding trusses, self-expanding communication satellite parts, and variant aircraft parts.

\* \* \* \* \*